(12) United States Patent
Hagens et al.

(10) Patent No.: US 8,453,228 B2
(45) Date of Patent: *May 28, 2013

(54) SYSTEM AND METHOD FOR VIDEO RECORDING, MANAGEMENT AND ACCESS

(75) Inventors: Robert Hagens, Superior, CO (US); Darren Paul Loher, Arvada, CO (US)

(73) Assignee: Envysion, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,304

(22) Filed: Sep. 7, 2012

(65) Prior Publication Data

US 2012/0331499 A1  Dec. 27, 2012

Related U.S. Application Data

(63) Continuation of application No. 12/028,822, filed on Feb. 10, 2008, now Pat. No. 8,291,484.

(60) Provisional application No. 60/890,229, filed on Feb. 16, 2007.

(51) Int. Cl.
*G06F 21/00* (2006.01)

(52) U.S. Cl.
USPC ............... 726/11; 726/3; 709/217; 709/225

(58) Field of Classification Search
None
See application file for complete search history.

(56) References Cited

U.S. PATENT DOCUMENTS

| 7,232,064 | B1 * | 6/2007 | Toohey | 235/384 |
| 2004/0130623 | A1 * | 7/2004 | Han | 348/150 |
| 2005/0226254 | A1 * | 10/2005 | Vimpari | 370/395.52 |
| 2005/0251856 | A1 * | 11/2005 | Araujo et al. | 726/12 |
| 2005/0273831 | A1 * | 12/2005 | Slomovich et al. | 725/105 |
| 2005/0273849 | A1 * | 12/2005 | Araujo et al. | 726/12 |
| 2006/0192675 | A1 * | 8/2006 | Renkis | 340/540 |
| 2006/0277314 | A1 * | 12/2006 | Hesselink et al. | 709/229 |
| 2009/0007251 | A1 * | 1/2009 | Abzarian et al. | 726/11 |
| 2012/0155426 | A1 * | 6/2012 | Verma et al. | 370/331 |

* cited by examiner

*Primary Examiner* — Philip Chea
*Assistant Examiner* — Kendall Dolly
(74) *Attorney, Agent, or Firm* — Neugeboren O'Dowd PC

(57) ABSTRACT

A server-based hosted application used to transmit and manage multiple media across the Internet. Digital video recorders (DVRs) collect media (such as video with or without audio) and record it to a local disk. DVRs are located in sites or stores where they are attached to cameras, microphones and point-of-sale (POS), or other data collection devices. The DVR accesses the Internet through a typical "residential" broadband connection. A hybrid peer-to-peer network allows peers (a DVR and an Internet browser) to directly transmit and receive video and audio (and other information, such as POS data). A hosted infrastructure tracks the presence of DVRs. A server-based application exposes a presence database to users. Users find DVRs via an Internet interface. Viewers can then connect to the DVR and its corresponding media collection devices (such as cameras, microphones and POS devices) and control collection and use of media information directly.

20 Claims, 9 Drawing Sheets

SYSTEM AND METHOD FOR VIDEO RECORDING, MANAGEMENT AND ACCESS

CROSS REFERENCE TO RELATED APPLICATION

This application is based upon, and claims priority to U.S. patent application Ser. No. 12/028,822, entitled System and Method for Video Recording, Management and Access, filed Feb. 10, 2008, and U.S. Provisional Patent Application No. 60/890,229, entitled System and Method for Video Recording, Management and Access, filed Feb. 16, 2007. The entirety of such applications, including all exhibits and appendices are incorporated herein by reference.

FIELD OF THE INVENTION

This invention relates to a system and method for integrated video and data recording, management and access. In particular, it relates to a network architecture that enables a user to easily access video and audio media which is stored across a large number of geographically distributed storage systems via an Internet Protocol (IP) network connection.

BACKGROUND OF THE INVENTION

Video and data surveillance systems are commonly used by individuals, businesses, and governments to remotely monitor activity. Increasingly, the Internet is being used as a method of accessing, monitoring and controlling remote surveillance systems. For businesses, video and data surveillance systems are frequently used to monitor one or more business processes and data sources.

Data sources include access controls, RFID tag readers, fire alarm systems, contact switches, motion detectors, environmental monitors, points of sale (POS) where transactions take place and other business information systems. Surveillance systems are capable of collecting data from data sources for purposes of monitoring business processes, quality assurance, safety, security, and fraud prevention. At POS locations, surveillance systems are capable of collecting transaction-related information. For example, if a cash register location is of interest, the surveillance system could capture a video image (plus audio, if desired) of the location as well as cash register data corresponding to the date, time, persons and events that are being recorded video-graphically. Other places of interest, including delivery docks, dressing rooms, doorways, money handling areas, mechanical rooms, data centers, construction sites, customer service areas and many more, are also monitored by such surveillance systems.

As the number of surveillance locations increase within a single business site, and as the number of separate locations increase for a particular business (for example, when the business owns multiple stores), the need to manage the collection and effective use of surveillance information increases correspondingly. In particular the complexity and manual steps required to use the system, ensure it is operating correctly, perform maintenance and upgrade the surveillance system grows with the number of remote locations.

Internet-based video, audio and data collection systems available today have many limitations. As depicted in FIG. 1, network compatibility issues arise because such systems often require each location to have a static Internet Protocol (IP) address rather than a dynamic one, thereby resulting in substantial Internet Support Provider (ISP) expenses. Additionally, such systems require the computer network in which the video, audio and data collection system is installed to be configured to accommodate the specific digital video recorder (DVR) that is implemented in the system. This configuration step is a costly manual procedure that requires a skilled worker.

Today's IP network video surveillance systems claim to eliminate the need for a video recorder at the remote site. This is often cited as a superior solution to installing a video recorder. However this solution requires large amounts of bandwidth, both at the remote location if multiple cameras are used and at a data center where the video is aggregated. The amount of bandwidth at the remote location normally exceeds the capacity of standard broadband Internet connections. To accommodate the bandwidth requirements, expensive leased line circuits must be purchased. The cost for this bandwidth is often higher that a business is prepared to pay when there are many remote locations involved. The only way to deal with this limitation is to install a video storage device at each of the businesses remote locations, thus removing the benefit of IP cameras without a video recorder at the remote site.

Often such systems offer limited POS support because, for example, only a printer emulation mode is used, which delivers a limited portion of the entire data set that has been collected. Another limitation of such systems is that the data is poorly integrated with video. For example, many systems allow only video (excluding other data) information to be exported from the system. Other systems overlay data graphically over the video, losing the ability to search and report on the data collected. Once exported, access to the Video and possibly the data are no longer controlled by the surveillance system.

From the system perspective, current state-of-the-art video, audio and data collection systems are limited because they comprise local systems that store surveillance information locally, they operate with static software. This solution is referred to as a standalone DVR. The standalone DVR normally requires a thick client solution—an approach that requires the installation of software on each user's computer in order to access video, audio and data collected at each standalone DVR. The thick client system with standalone video recorders contains no shared component between the many DVR's or the thick clients. This makes aggregating and sharing video, audio and data information very difficult and time consuming for users. In addition, such a video, audio and data collection system requires a labor intensive process of viewing data one location at a time. Moreover, standalone DVR's and current thick client systems are expensive to place in the field because such systems require management of configuration, security and maintenance of the thick client software installed on each user's computer and at each DVR. This management is labor intensive because it must be performed on each user system and each standalone DVR, one at a time. The number of users can be substantial. In many businesses there is a desire for many employees to use the system, often exceeding the number of locations in the business. These limitations increase the complexity and cost of managing the security, software, hardware and installation of the system to the point that in the best case, only a limited number of users are given access to the system. In the worst case, the overall cost outweighs the benefits and the system is not installed.

In light of these limitations, there is a need for a thin client network architecture for a video, audio and data collection, monitoring and access system that links its users to remotely collected video, audio and data information and that provides the user comprehensive access to, and control over, the surveillance capabilities installed in remote field locations. A "thin client" is a client computer or client software in a client-server architecture network that depends primarily on the central server for processing activities, and mainly focuses on conveying input and output between the user and the remote server. Many thin client devices run only Internet browsers or remote desktop software, meaning that all significant processing occurs on the server. Accordingly, a system and method for integrated video, audio and data recording, access, management and control is disclosed.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art will recognize that there are numerous modifications, equivalents and alternative constructions that fall within the spirit and scope of the invention as expressed in the claims. It is not the intention to limit the claims, or any of the terms therein, to any specific embodiments disclosed in the specification, unless specifically indicated as such.

In accordance with the present invention, the above-described limitations of surveillance systems have been reduced or eliminated. One aspect of the disclosure can be characterized as a video, and data recording, management, and access system comprising a customer network, a user network, one or more network address translating modules and/or firewalls, a data center, a virtual private network (VPN) server, and a VPN. The customer network can include a VPN client and can be operable to video-graphically record video and Point of Sale (POS) events and to generate data from the POS events. The customer network can also comprise a video camera to generate video images of the video and POS events and a POS device adapted to collect POS data. The customer network may further be operable to transmit the video images and the POS data using a communications network. The user network can be operable to access the video images and POS data on the customer network. The one or more NATs and/or firewalls can protect the customer network and the user network from public access. The data center can be coupled to the customer network. The VPN server of the data center can be coupled to the customer network via a VPN established by the VPN client. The VPN server may also be coupled to the user network via a public Internet and an exception in a NAT and/or firewall of the VPN server. The VPN can be established by the VPN client to the VPN server. The VPN server can associate a public IP address with the VPN client and can make the public IP address available to the user network via the exception in the NAT and/or firewall of the VPN server as well as a public Internet connection. The user network can access the video images and POS data on the customer network by directing communications to the public IP address, which the VPN server can then route to the customer network via the VPN.

Other aspects of the disclosure can be characterized as a system for two-way communication between a first and a second computer. The system can include a first computer of a user network, a second computer of a customer network, a VPN server, and a VPN. The second computer can be a VPN client and the first computer can have access to one or a plurality of public IP addresses of the VPN server that the VPN server associates with the second computer. The VPN can be established from the second computer to the VPN server. The first computer can communicate with the second computer by directing transmissions to the one of a plurality of public IP address. The transmissions from the first computer to the second computer can pass through a public Internet to the VPN server where the VPN server routes the transmissions to the second computer via the VPN.

Yet other aspects of the disclosure can be characterized as a method for recording, monitoring and accessing video and data. The method can include establishing a virtual private network (VPN) between a VPN client and a VPN server. The method can further include associating one of a plurality of public IP addresses, assigned to the VPN server, with the VPN client. The method may further include creating an exception in a network address translating module (NAT) and/or firewall of the VPN server that enables a user network to access the VPN server through the public Internet. The method can further include exposing the one of the plurality of public IP addresses to the user network via the exception and the public Internet. The method can further include requesting access to video and point-of-sale data of the VPN client using the one of the plurality of public IP addresses, where the request is routed through the public Internet and the exception in the NAT and/or firewall of the VPN server and then routed to the VPN client via the VPN.

The above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
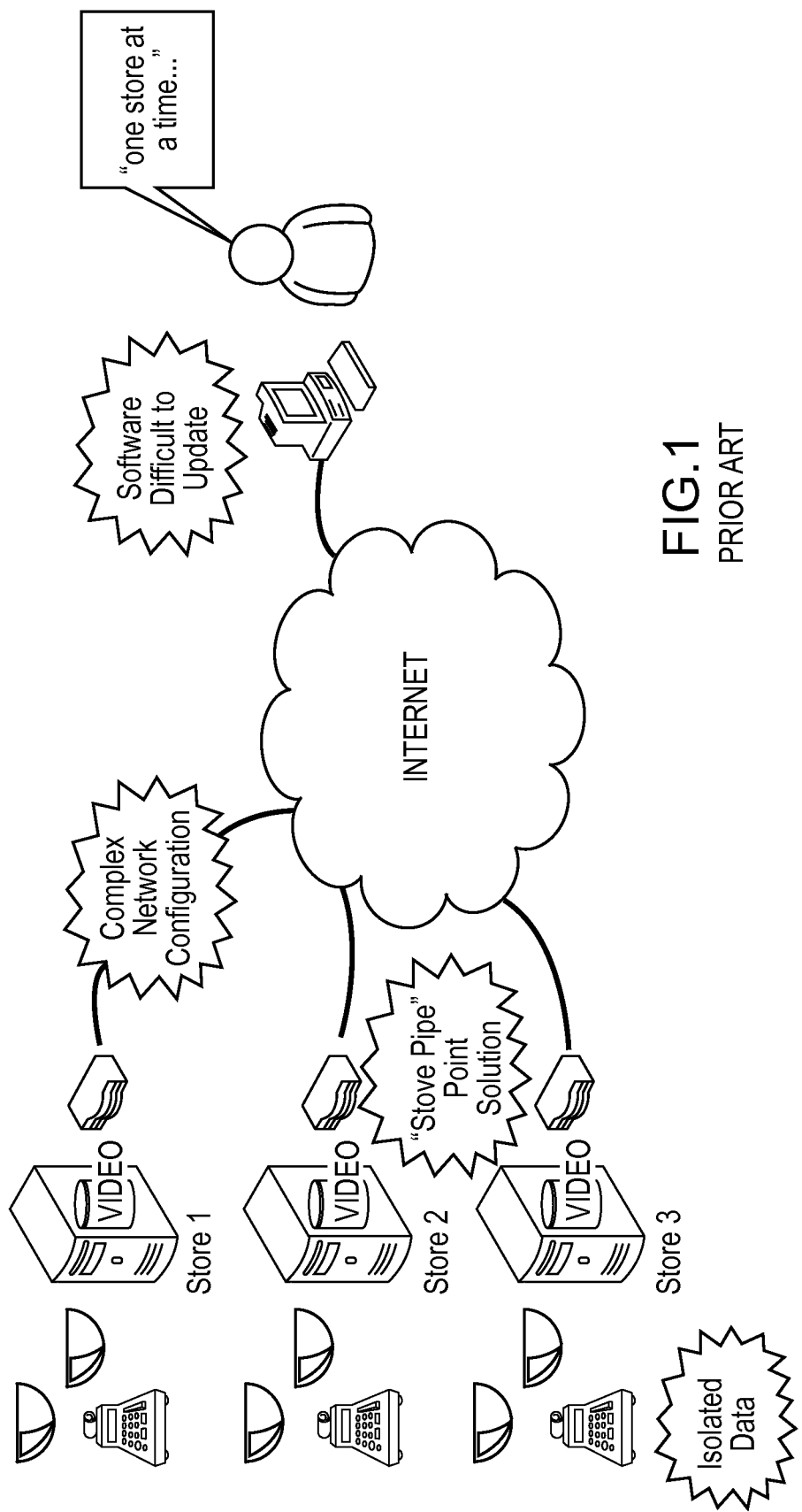
FIG. 1 is a block diagram depicting a current and typical state-of-the art video and data recording, monitoring and access system.
Figure 2:
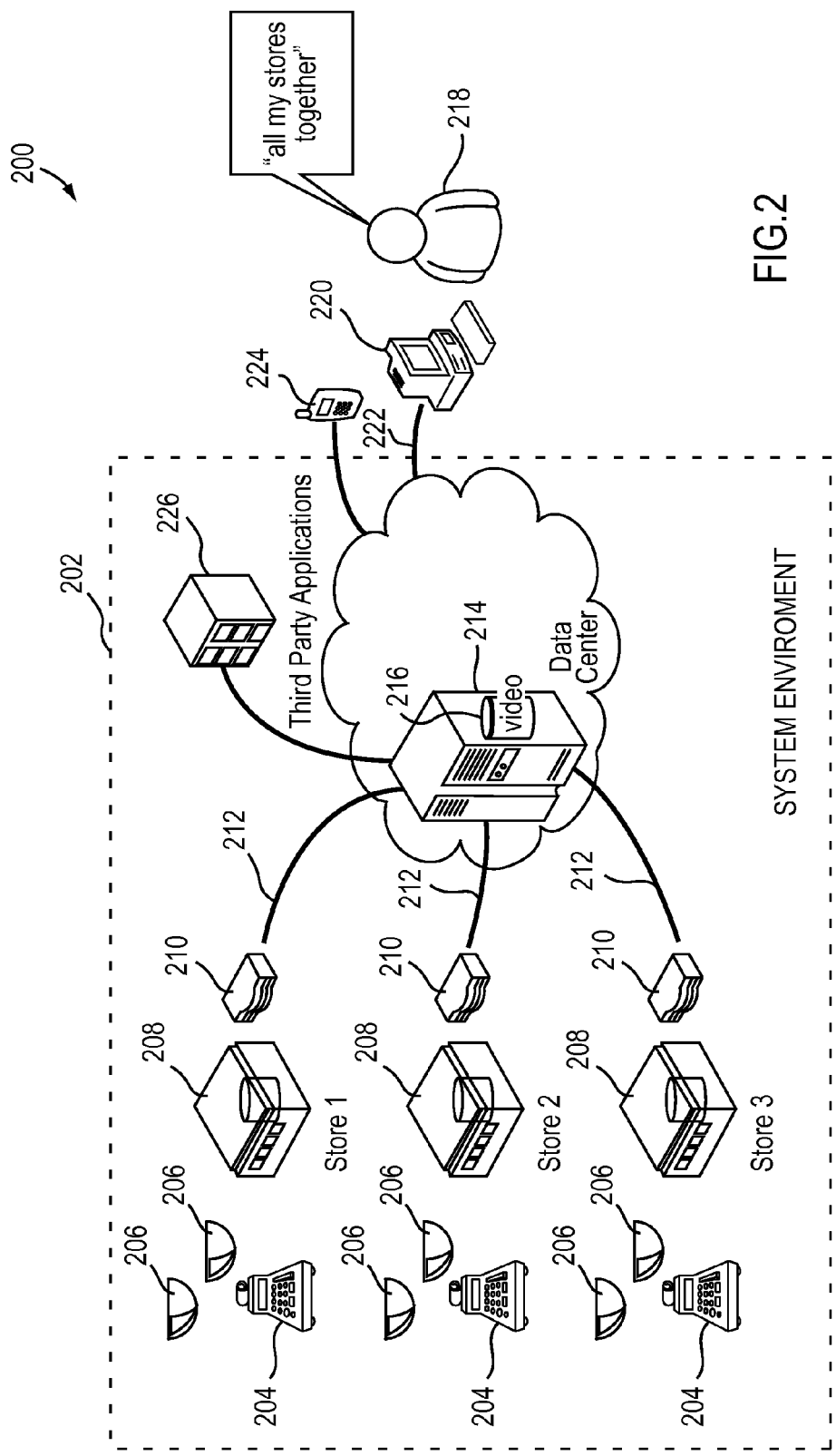
FIG. 2 is a block diagram depicting an exemplary embodiment of a video and data recording, monitoring and access system constructed in accordance with an aspect of the present invention.

Referring now to the drawings and referring in particular to FIG. 2, shown is a block diagram depicting an embodiment of the network architecture 200.

FIG. 2 illustrates the system architecture 200 of one embodiment of a video, audio and data recording, management and access system. It illustrates several advantages of the present invention over the current state-of-the art surveillance systems for a system user that monitors multiple locations, for example a number of stores in different locations. A system environment 202 is depicted. In FIG. 2, three separate stores (store 1, store 2, and store 3) are depicted for illustrative purposes; however, one skilled in the art will recognize that the system disclosed herein can be scaled to accommodate virtually any number of separate locations. As illustrated in FIG. 2, a set of store surveillance equipment (also referred to herein as "customer premises equipment," or "CPE") comprises at least one data source, depicted in this example as a point-of-sale device 204, one or more video cameras 206, a digital video recorder (DVR) 208, a broadband Internet access and firewall device (such as a broadband modem or router) 210, and access to the Internet 212 (such as via DSL, cable, satellite, wireless, or any other known or foreseeable method to access the Internet). Also within the system environment 202 is a data center 214 which serves as the central access and control center for system users. Included in the data center 214 is a media (video and audio) storage device 216 which has the capability to store data (point of sale and other) and media (video, audio and other) information collected from the CPE at the remote locations (for example, at stores 1, 2 and 3).

As depicted in FIG. 2, the user 218 of the video, audio and data recording system disclosed herein gains access to the system environment via an Internet portal to the data center 214. A standard computer 220 having Internet access 222 provides such access to the system environment 202, as does any other device that can access the Internet. For example, a cell phone, personal digital assistant (PDA) or other mobile device 224 can be used to access the system environment 202 via the Internet. Third party applications, hosted on an enterprise system 226, including, for example, video (and audio) analysis capabilities, are also accessible to the user 218 through the system environment 202.

The system architecture 200 solves several problems. First, it supplies a service that allows users 218 to find and connect to plug-and-play digital video recorders (DVRs) 208 and other CPE installed across the Internet usually behind a network address translating (NAT) device and firewall 210. Second, it provides detailed control of the CPE, including DVRs 208, and the DVRs' attached media capture devices, primarily cameras 206 (but also including, for example, POS devices 204) over the network.

The system provides scalable search features, connectivity and control of highly distributed live and archived audio/video. The system makes it possible to easily access large quantities of unique content on highly distributed media servers, including: tens of thousands of media servers; hundreds of petabytes of media stored on distributed media servers; tens of millions of transaction records originated from distributed data collection servers (the tens of thousands of media servers); and thousands of simultaneous viewers. The system has the ability to keep track (anonymous or not) of media/viewer usage. It preferably features automatic, zero-configuration installation for media servers and viewers, and a low-cost, lightweight, low maintenance infrastructure.

The system environment 202 comprises consumer-grade broadband Internet access; media servers and viewers behind unknown, off-the-shelf retail or consumer-grade network address translating (NAT) and firewall; multi-vendor media servers and vendor extensible control functions; and live or real-time video and stored video.

Figure 3:
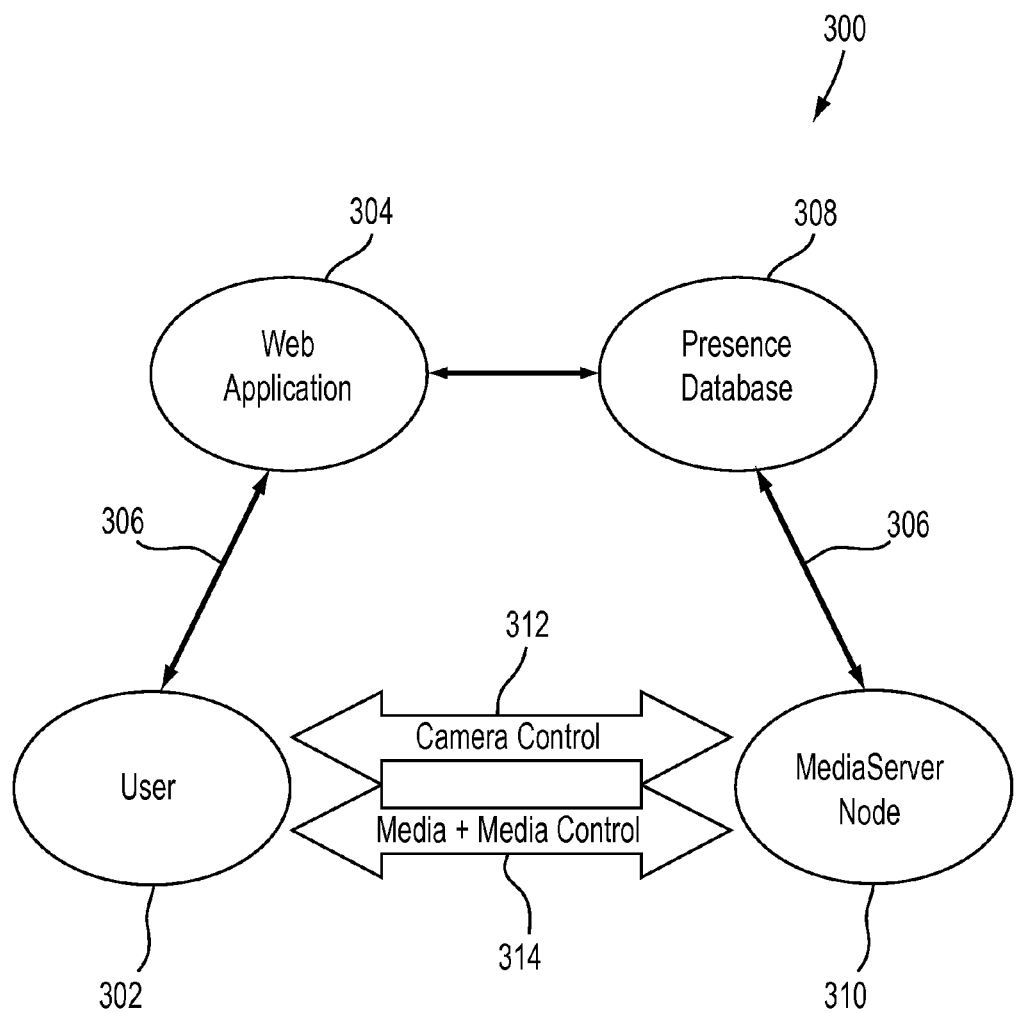
FIG. 3 is a block diagram depicting a high level architectural representation of an exemplary embodiment of a video and data recording, monitoring and access system constructed in accordance with an aspect of the present invention.

FIG. 3 depicts, at a high level, the architecture 300 of an exemplary embodiment of a video, audio and data recording, monitoring and access system. A system user 302 accesses a server-based application 304 via a secured Internet connection 306. The server-based application 304 links the user to video, audio and data stored on media servers 310. The media servers 310 are numerous and distributed, so they register themselves to a presence data base 308 so the server-based application 304 can easily locate them. The presence technology allows Media servers 310 to be located anywhere on the Internet, even behind broadband connections with network address translation (NAT).

NAT is a technique of transmitting and receiving network traffic through a router that involves re-writing the source and/or destination IP addresses (and usually also the TCP/UDP port numbers of IP packets as they pass through). Most systems using NAT do so in order to enable multiple hosts on a private network to access the Internet using a single public Internet protocol (IP) address. Normally NAT systems only allow connections to be made from the private network 410 to the public Internet, but not vice-versa.

The disclosed system enables peer-to-peer streaming of live and archived audio-plus-video between media servers and viewers. A distributed set of directory services allow peers to publish their presence in the presence data base 308 and search for and locate each other in the Internet. Secure control channels 312 and 314 allow interactive control of a media server and its attached devices over the system network directly between a user 302 and the media server 310. A standard set of controls are defined as well as a method to transport arbitrary control data. The types of controls performed include: live camera controls (for example, pan, zoom, and tilt); media start, media stop, media offset (time, byte, etc.); a search language to locate and search for media servers and media stored on those servers; and the ability to encapsulate arbitrary control messages for the purpose of extension and backwards compatibility support for multiple vendors and legacy media servers, which may not even be IP-based.

The system is preferably a server-based, hosted application used to transmit and manage multiple media across the Internet, although it is contemplated that any other type of distributed data system may be used to implement the system. Digital video recorders (DVRs) collect media (such as video or audio) and record it to a local disk. These DVRs are located in sites or stores where they are attached to cameras, microphones and point-of-sale (POS) devices. The DVR must also have Internet access, through a typical broadband or other connection. A hybrid peer-to-peer network allows peers (a DVR and an Internet browser) to directly transmit and receive video and audio. A hosted infrastructure tracks the presence of DVRs. A server-based application exposes the presence database to users. Users find DVRs via an Internet interface. Viewers can then connect to the DVR and control media directly.

Figure 4:
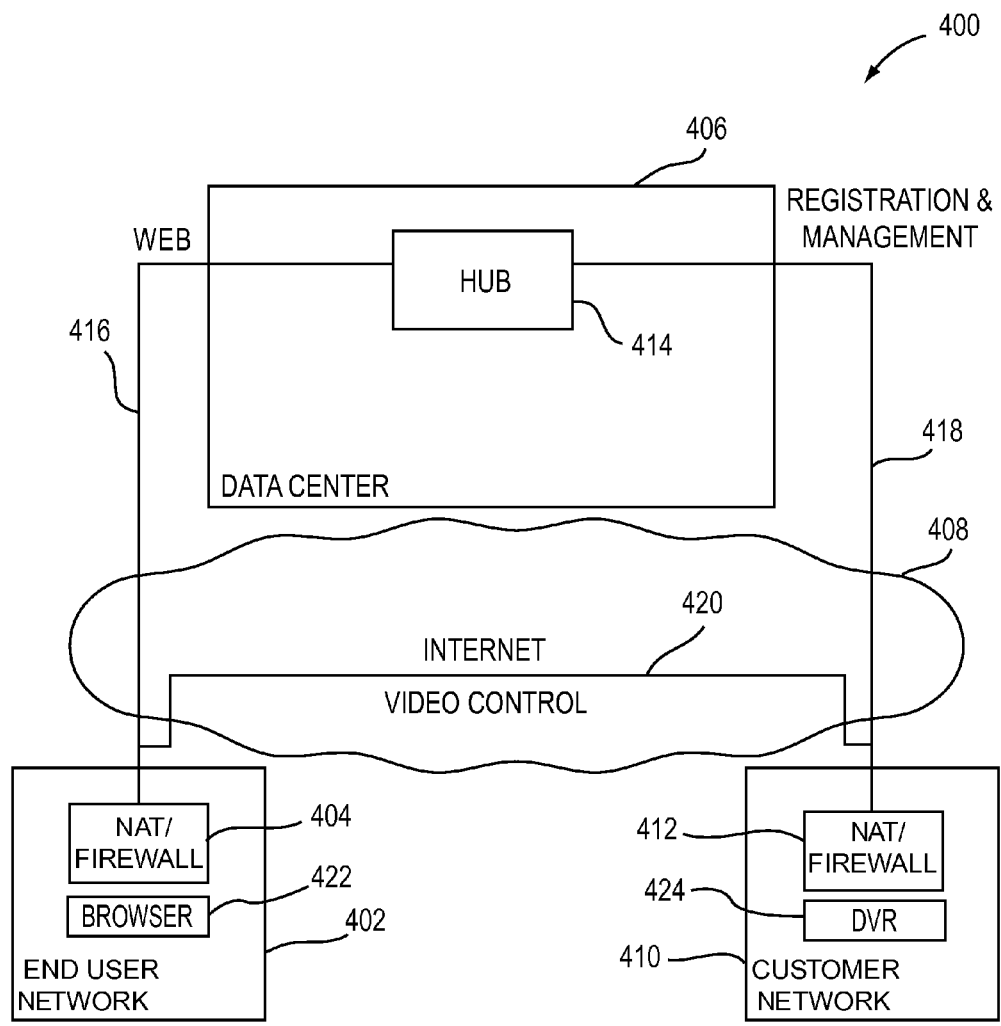
FIG. 4 is a block diagram depicting a physical allocation of an exemplary embodiment of a video and data recording, monitoring and access system constructed in accordance with an aspect of the present invention.

Referring now to FIG. 4, depicted is a block diagram representing a physical allocation 400 of an exemplary embodiment of the disclosed video, audio and data recording, monitoring and access system. The end user network 402 includes an NAT/firewall device 404. Access from the user network 402 to the data center 406 is gained via the Internet 408. The customer network 410 also includes a NAT/firewall device 412. Within the data center 406 is a hub 414 that serves to house server-based applications and facilitate user access to media stored both locally at the data center 406 and remotely at the customer network 410. Internet connection 416 provides the user access to server-based applications. Registration and management connection 418 provides access between the data center 406 and the customer network 410. Video control connection 420 provides direct access between the user browser 422 and the DVR 424 within the customer network 410. The system architecture depicted in FIG. 4 is simplified, showing only one user network 402 and one customer network 410, for illustrated purposes; however, one skilled in the art will recognize that the system disclosed herein can be scaled to accommodate any number of separate end user networks and customer networks.

Figure 5:
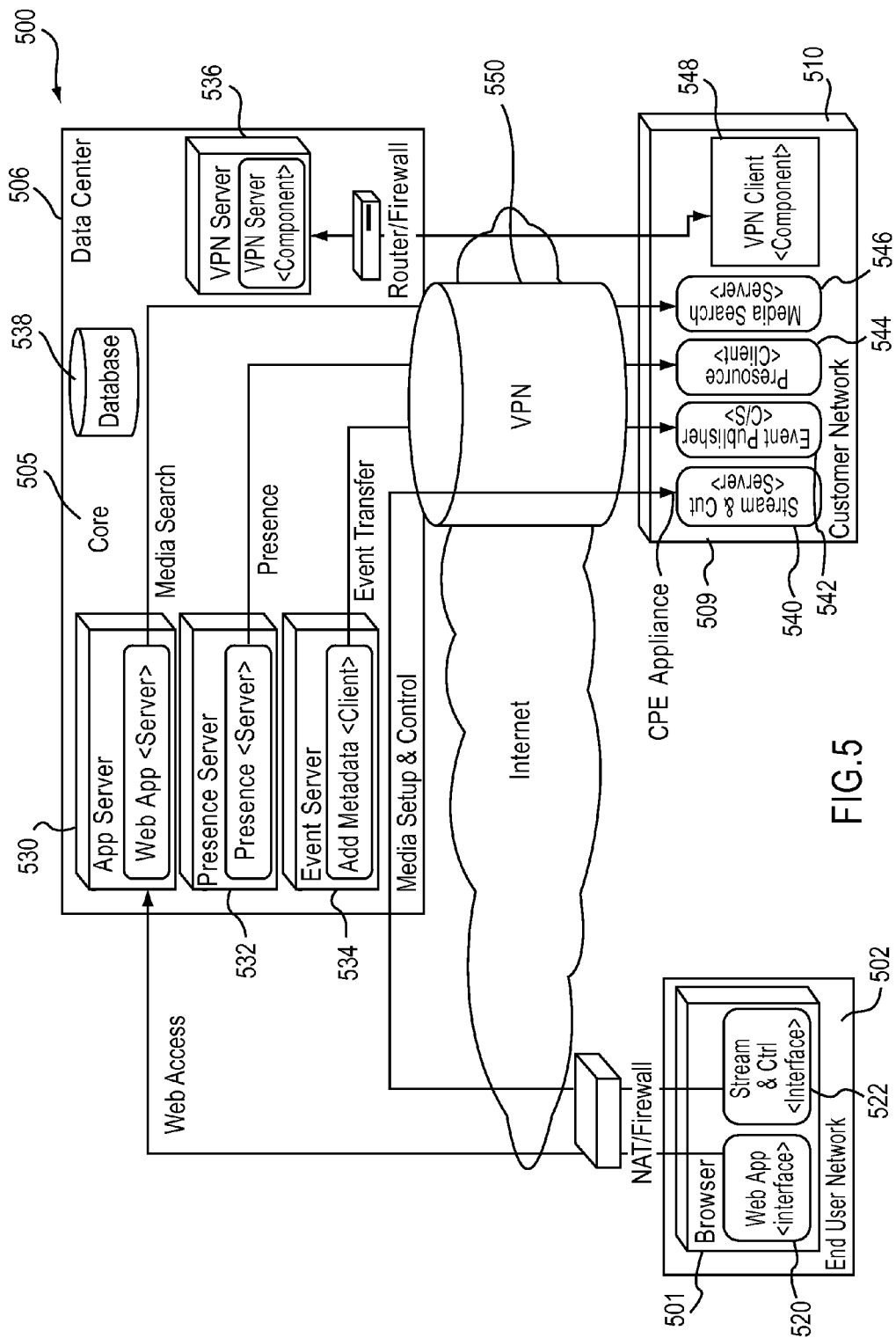
FIG. 5 is a block diagram depicting both physical and functional allocations of another exemplary embodiment of a video and data recording, monitoring and access system constructed in accordance with an aspect of the present invention.

Referring now to FIG. 5, the overall system architecture 500 is divided into three functional areas: the browser 501, located within the end user network 502; the customer premises equipment (CPE) appliance 509, located within the customer network 510; and the core 505, located within the data center 506. Each is described below.

The browser 501 comprises two components: the server-based application (or graphical user interface, "GUI") 520, and the media player (or stream and control application) 522. The media player 522 manages control of media streams as well as presentation of the media to the user.

The CPE appliance 509 comprises five components: First, the media streaming server 540. This server component is responsible for responding to media streaming requests and media control. Second, the event publisher 542, which is responsible for reliably transferring data events from the CPE appliance 509 to the core 505 or data center. Third, the presence management client 544, which is responsible for communicating the identification and address information about the CPE appliance to the core 505, as well as maintaining this information over time. Fourth, the media search facility 546, which is responsible for searching through video that is stored on the CPE appliance 509. This component returns a URL that can be passed by a media player 522 to the stream server 540. And fifth, the communication management (VPN) 548 facility. In one embodiment, a VPN tunnel 550 is used to guarantee two-way NAT/firewall traversal. In an alternative embodiment, the VPN tunnel is replaced or augmented with an alternative protocol for NAT traversal.

In one embodiment of the system, a VPN tunnel is utilized to perform NAT traversal. The following process is used to deal with network issues created by NAT. The media server 510 opens a VPN connection 550 to the VPN Server 536, which creates a two-way communication path between the core 505 and the media server 510. Because the media server 510 opens the connection from inside the customer network 510, no special NAT configuration on the customer firewall 412 is required. The media server communicates its customer network 510 IP address and it's VPN Client 548 IP address to the presence system. This creates two IP communications paths to the media server 510 which can be used by the core 505 and the Stream and Control Interface 522. The VPN path guarantees that all the components in the core 505 and the browser 501 always have at least one available IP network path for direct control over remote cameras and direct access to, and control over, media information (for example, stored video) stored on the media servers 310. The customer network 510 can also be used as a communication path when the Stream and Control Interface 522 determines it has access. The Stream and Control Interface 522 in the user's browser 501 determines the best path by attempting to communicate to the native IP address of the media server 510 and the VPN assigned address of the media server 510. The Stream and Control Interface 522 can use a variety of algorithms to choose which path is preferred. In one embodiment, Stream and Control Interface 522 can use a priority assigned at the presence server 532 or in the Presence client 544. In another embodiment the Stream and Control Interface 522 may select a communications path by sending requests to multiple IP Addresses and selecting the IP address responds first.

In another embodiment the VPN tunnel may be augmented or replaced by a alternative NAT traversal protocol. Several Internet proposed standard protocols exist for this including STUN, TURN and ICE. In addition, methods for hole punching protocols are documented on the Internet.

The core 505 comprises four basic components: First, the Internet portal/application server 530, which is responsible for serving the web content and implementing the overall application logic. Second, the presence server or system 532, which is responsible for responding to presence registration. Third, the event server (also referred to herein as the event server) 534, which is responsible for storing and validating the sequence of transactions received from the CPE appliance 509. And fourth, the virtual private network (VPN) server 536, which is responsible for the server side processing of the VPN tunnel 550.

In one embodiment, the system network employs several protocols. Media server 540 to data center 506 communication is facilitated by using a virtual private network (VPN) 550. Media server presence management is managed via session initiation protocol (SIP) and the REGISTER method. SIP also has many other capabilities that may be used to extend functionality of the system. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer. SIP has the following characteristics: It is transport-independent, because SIP can be used with UDP, TCP, ATM & so on. It is text-based, allowing humans to read SIP messages. SIP makes use of elements called proxy servers to help route requests to the desired current location, authenticate and authorize users for services, implement provider call-routing policies, and provide features to users. SIP also provides a registration function that allows users to upload their current locations for use by proxy servers. Since registrations play an important role in SIP, a User Agent Server that handles a REGISTER is given the special name "registrar." It is an important concept that the distinction between types of SIP servers is logical, not physical.

In one embodiment of the system, media setup and control is accomplished via real time streaming protocol (RTSP). Media search 546 is accomplished via an extensible markup language (XML) message encapsulated within hypertext transfer protocol (HTTP). Media access security is managed by use of a custom protocol. And event transmission is accomplished by use of an advanced system log (syslog next-generation). Domain name system (DNS) will used by external systems, such as $3^{rd}$ party applications, which may not have direct access to the presence system, to locate media server nodes. For example, Internet browsers and third-party software can use DNS to get the current IP Addresses of media servers. This enables many applications on the Internet to communicate with media servers using the Internet standard DNS and without having to integrate to the system. In one embodiment, the presence server is integrated with DNS servers using a lightweight direct access protocol (LDAP) server. One of skill in the art would understand that any of the above preferences could be substituted with a structure or process that performs a similar function as those described above.

Following is a more detailed description of the presence system 534. The presence system 532 supplies a method for hosts to publish their existence on a network. In one embodiment of the system, a host in the presence system is a DVR 510. Other embodiments may add the Stream and Control Interface 502 as a host in the presence system. The presence system 532 uniquely identifies each host and collects network connectivity information associated with each host. Connectivity information includes at least one of a plurality of IP addresses the host currently had bound to it. This information is stored in a data base for other applications to access. The presence system 532 will update the data base as necessary to maintain an up-to-date list of all connected hosts. In addition, the system keeps a history of hosts which have connected in the past.

To be "present" on the network, the main functions the nodes perform are discovery, registration and capability reporting.

The presence server 530 comprises at a minimum, the data indicating which nodes have joined the network and those nodes' contact addresses. The presence server 530 comprises a central master data store and several read-only replicants. Reliability and scale is achieved using simple one-way replication of data from the master server to subordinate servers. All updates for contact information are sent to the master database server. All queries for contact information are directed to the read-only copies of the database. An advantage of this design is that there will be large numbers of very simple queries by many systems which need to know the current contact addresses for nodes in the presence system. In one embodiment of the system, an SQL database may be used for the presence database. In another embodiment, an LDAP database may be used as a front-end to the presence database. In yet other embodiment, the DNS may be used as a front-end of the presence database as described above.

DVR appliances discover and connect to presence servers 532 located on the public Internet. A server-based application 520 will use the presence database to create web pages which contain reports and links to DVRs using the contact information from the presence database. Users can access currently connected DVRs by using the links provided by the server-based application.

The presence system 532 meets the scale, reliability and performance requirements defined in a deployment architecture. The hosted infrastructure supplies an Internet portal to the customer's data and media resources. The portal helps the customer to find interesting data and media which are likely located on DVRs distributed across the customer's sites.

In one embodiment, the presence server 532 runs an SIP User Agent Server (UAS). This server implements the SIP REGISTER method and maintains a database of information derived from the SIP registration process. In addition, enhancements are made to the SIP register to carry additional IP network contact information.

The presence server 532 comprises data indicating which nodes (DVR's) have joined the network and those node's contact addresses.

Following is a more detailed description of the event server or system 534. The purpose of the event server 534 is the centralized collection of events from a CPE appliance 509 and/or external CPE systems 612 connected to a CPE appliance 509. In one embodiment, the CPE appliance is a DVR. In most cases, event data can be correlated to media data via timestamp information. Timestamps are applied by Event Publisher 542 as the data is received. In addition, timestamps embedded in the event data may be used. These timestamps allow the event data to provide an additional index capability to the media (e.g., find all video related to void transactions between 1:00-3:00 PM today). The event data is available to the server-based application server 520 via the App Server 530 and Event Server 534.

The event system 534 provides for the transmission of discrete event messages in either direction from the CPE appliance 509 to the server-based application 520. The CPE Appliance 509 contains an event publisher 542. The event publisher 542 obtains or receives data from an external data source such as a POS 612. The event publisher 542 may perform processing of the event data. Next the event publisher 542 sends this data to the Event Server 534. The Event Server 534 may also perform processing of the data, and then stores the event data in a database 538. In one embodiment, the event service 534 and event publisher 542 are implemented as an event bus, enabling all the components in the system to observe events as they occur. For example, an event from a data source may be used to trigger media recording. The structure of the event data is extensible and generally follows an attribute/value pair scheme.

The event system 534 supports real time publishing and storage (in the core service layer 505) of a large volume of messages. In one embodiment, thousands of messages per second may be received, processed and stored. In other embodiments, messages may be periodically stored in bulk to improve performance. Because timestamp information is applied by the Event Publisher 542 the Event Server 534 is not required to load data in real time in order to preserve the important time stamp information. It is acceptable (or even desired) to partition event data across multiple servers, therefore allowing for a static load balancing approach which greatly increases capacity and performance for searching event data.

The most critical aspect of the event system 534 utility is its search interface performance with respect to the expected data volume (even with partitioning data across servers). The primary user of the search interface is the server-based application 520 which communicates with the Application Server 530. Because the Application server and event data are located in the core 505, searching data across multiple data sources is straightforward. Using search criteria from the actual event data and achieving acceptable response time is an important consideration. In one embodiment, the search component allows dynamic routing of search requests to a data store based on context information. The context may be based on the CPE appliance the event data was collected from. In another embodiment, the data may be partitioned by the identity of the customer.

Following is a more detailed description of the media server 540. Media servers (at the Appliance) acquire and generate media (video and audio data). This media may be stored in a device containing a media server 540, such as the Appliance 509, or in other storage devices. When media is stored in a device containing a media server, 540 and Presence Client 544, the data can be accessed by the overall system 500. Media servers 540 normally reside within an Appliance 509. The Appliance 509 may be located anywhere in a communications network. For example, the Appliance 509 may be connected directly to the Internet 560, a customer network 510 or to the Data Center 506 network. Media may be copied or moved from an Appliance 509 to a storage system without the Media Server 540 or Presence Client 544 where the media is considered to be offline and inaccessible to the system. Later, the media can be made accessible again by copying or moving the data to a device containing a Media Server 540 and a Presence Client 544, such as an Appliance 509.

In one embodiment, a typical Appliance 509 containing a media server 540 and Event Publisher 542 at a customer premise experiences the following volume: 3,000 events per day (at the low end), 11,000 events per day (at the high end); peak 5-minute event volume of 100 records; peak 1-hour event volume of 1200 records and approximately 1 Megabyte of video per minute, per video camera 606. A typical Appliance 509 will have 4-16 video cameras 606 attached. The foregoing assumes busy hours at 7-9 am, 11-2 pm, and 6-9 pm local time (with the majority of data arriving at the data centers during these times). Other events times of interest include customer facility opening, closing, shift changes. In this embodiment, the Event Server 534 and database 538 is sized to handle 20,000 event publishers; 60-220 million events per day. The amount of video stored however has no impact on any components within the Core 505 of the Data Center. This is a significant scalability advantage over systems which support only centralized storage of video. However, storage of video can be performed at the data center if desired. In one embodiment, Video can be streamed from an Appliance 509 at the customer network back to the data center where it is stored in another, likely much larger Appliance. In another scenario, video data may be streamed by cameras directly to a Media Server 540 residing on an Appliance 509 in the data center. One skilled in the art will recognize that customer premises experiences will vary widely depending on the specific applications and environments for which the system will be used.

The video, audio and data recording, management and access system disclosed herein is capable of capturing motion video and selectively recording or storing only the video which contains motion. The amount of storage space used by motion video capture is based on an assumption of how much time per day there is motion, on average, across all cameras for a given Appliance 509.

In one embodiment, "interesting media" is stored both on the Appliance at the customer location and at the data center. The quantity of interesting media is based on an assumption of sixty minutes of media per camera per day. Interesting media is defined by business rules. An example business rule is when motion occurs on the camera facing the back door between midnight and 6 am in the local time zone of the customer premise. Interesting media can automatically copied from the Appliance at the customer location to another Appliance 509 located at the Data Center 506. This approach yields the advantage of continuous recording of media at the customer premise, but also the advantage of storing the most important media at the data center where it can be preserved outside of the customer network. One skilled in the art will recognize that such assumptions will vary widely depending on the specific applications and environments for which the system will be used.

Due to the large volume of storage space consumed by media (audio and especially video), a preferred embodiment is to store all media at the Appliance 509 and only "interesting media" at media servers in the data center. In one embodiment where 20,000 Appliances are deployed, such an implementation saves over 1.7 petabytes of data transfer from the Customer locations to the Data center and storage of that data at the Data Center.

In the embodiment where 20,000 appliances are deployed, the interesting media amounts to approximately 250 TB of data transfer and storage per month. At this time, this is not an overwhelming or exceedingly costly amount of data to transfer and store. So transferring and storing the "interesting" media at central data centers is a viable option even at the very large scale of 20,000 appliances. The processing of business rules for "interesting media" for transfer to the central data center can be performed by the Media Server 540 on the Appliance 509 or by the Event Server 534 in the Data Center 506.

In addition, the increased speed of access, availability and reliability for the "most interesting" video provides significant value for the user. In one embodiment advanced video processing capabilities may be able to be performed on the "interesting video" that may require significant computing power that is not available on a small, remote media server appliance.

Creation of business rules is be performed using the Application Server 530. Individual customers may create their own rules and may also use collaborative input from an interactive sharing environment hosted by the Application Server 530. The information and business rules which are discussed and created on the Application server 530 may then be shared between different customers and across various users in order to educate and inform others of information relevant across a wide range of industries. For example, users may use the system to share information concerning new styles or methods of shoplifting so that other users of the system can be proactive to stop such occurrences from happening.

The location and length of time to store data is determined by business rules and equipment capacity. Data may be stored from zero days to several years. However, the most common storage time is expected to be 30 days. Storage procedures of event data and video data may vary depending on rules encompassing the event, location and user defined business rules. After the storage time has expired, data may then be deleted or moved to offline storage where it is considered an archive. The archived data may be copied to a device with a Media Server 540 and Presence Client 544 restoring system 500 access to the data.

Regarding point of sale (POS) systems, it is feasible and cost effective to store all event records for all customers on both the Appliance 509 and at the data center 506. This is valuable for users to perform searches of this important event (or meta) data.

In one embodiment of the video, audio and data recording, management and access system, the Appliance 509 may operate over as many as three customer networks simultaneously. The presence client 544 and presence server 532 are capable of discovering these networks. The networks are the local customer network 510, Internet 560 and VPN 550 connections of the Appliance.

The Event Publisher 542 and Event Server 534 enable reliable transport of messages from an Appliance 509 to the core 505. These components include error checking to prevent lost, dropped or altered messages. In one embodiment the Appliance 509 is able to cache at least 48 hours (57,600 records) of event messages to mitigate network connectivity (to core servers) outages.

The following items list any assumptions and dependencies to other components of the system architecture:

Security—The Appliance 509 establishes a VPN tunnel 550 to the core services network 505, and this provides sufficient confidentiality. From an authorization perspective, it is desired to validate the authenticity of the client by simply comparing the appliance id and IP address (which is contained in any message from the event client 534) with the id/IP address pair that is registered with the presence server 532. In addition, a security system is used by the VPN Server to authenticate the Appliance and for the Appliance to authenticate the VPN Server. This is to prevent unauthorized systems from connecting to the data center and to prevent Appliances from connecting to a false data center. In one embodiment, an SSL certificate based system using certificates for both the clients and the VPN servers is used for this authentication.

Data Expiration—The time period which defines how long event data and the related media data is stored is handled independently and can be subject to different algorithms.

External Interfaces—None of the interfaces of the event system 534 are to be used by non-trusted agents (only the services within the Core 505 and Appliance 509 are trusted). External systems may interface through the Application Server 530 or by new components added to the Core which implement safeguards appropriate to the information being communicated to the External system.

Figure 9:
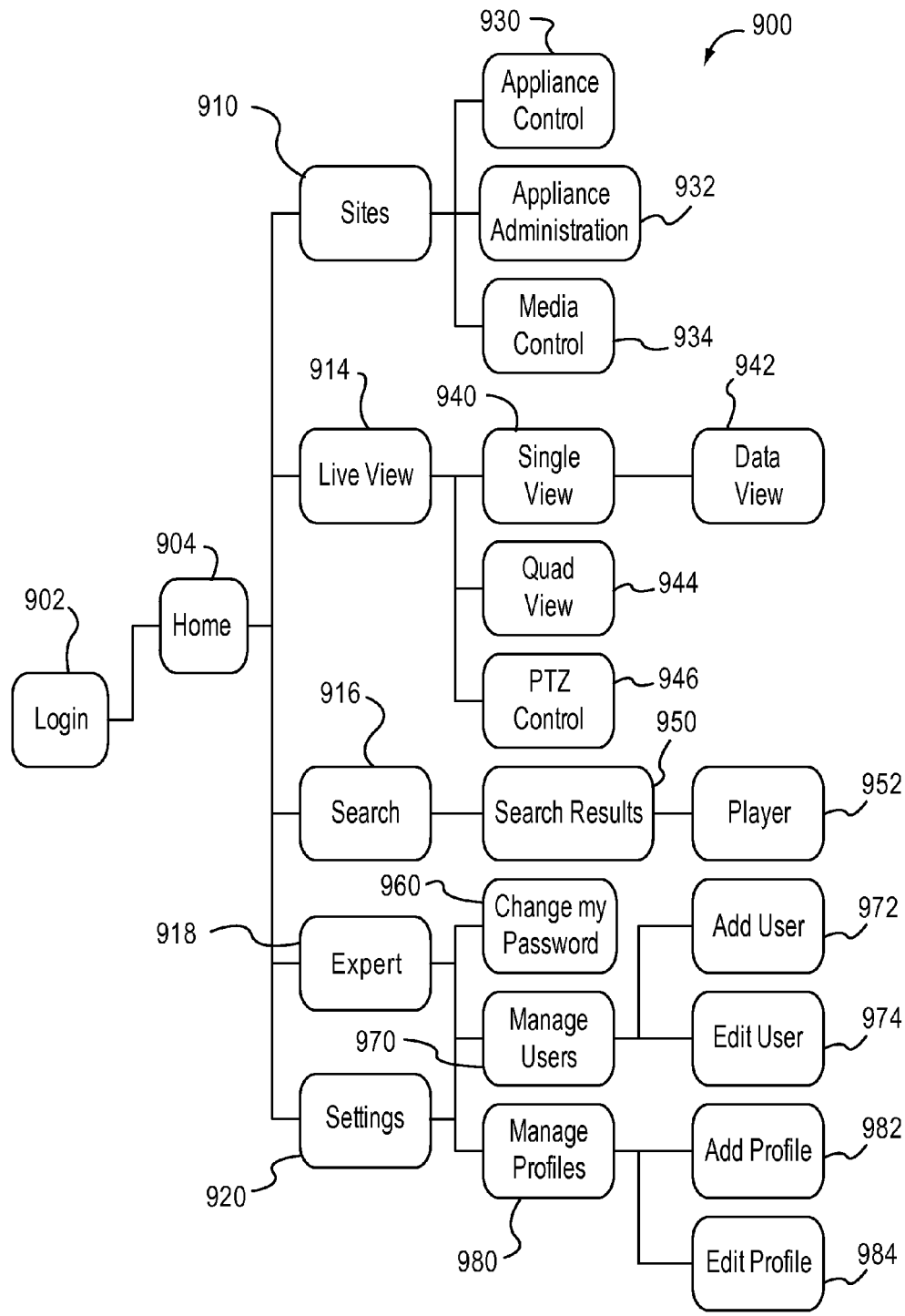
FIG. 9 is a block diagram depicting a site map of another exemplary embodiment of a video and data recording, monitoring and access system constructed in accordance with an aspect of the present invention.

The web browser 501 contains a web application interface (or Graphical User Interface—GUI) 520 and comprises the following major components of functionality, as illustrated in FIG. 9: a home page 904, configuration sites (appliances and media sources) 910, live viewing 914, searching 916, and detailed configuration settings 918.

The following functionalities are provided by a system constructed in accordance with one or more aspects of the present invention. The use of any of the following terms in the claims is not meant to restrict such claim term to the specific descriptions included below, but to refer to the functionality in general:

Relay Point—hardware I/O device cable of sensing ON/OFF (input) or setting ON/OFF (output).

Media Player—the software residing within a user's web browser capable of rendering a specific media type on screen or via local speakers so that the user can sense the media presented. The Media Player is also referred to as the stream and control application 522.

Media Server—the server providing playback services for one or more media streams. Different media streams may originate from different media servers. A media server may reside on the same or a different host as the web server the media is invoked from. This is also referred to as the Stream and Control Server 540.

Media Stream—the sequence of packets that convey a specific media type over a network connection, e.g., an audio stream or a video stream.

Media—a generic reference to an instance of a specific type of media. Examples are media include audio data and video data.

Configuration Server—a software application residing in the network that hosts server configuration files and software updates to appliances.

Server-Based Application—the collection of software components and servers that together provide the application, management, and delivery of video and audio media to the user.

Appliance or DVR—a device that contains a disk or other data storage device, connects to media inputs (e.g., cameras and microphones) and records media. The Appliance is often located on a customer network but may also be on other communications networks including the Data Center and the Internet.

User—person who uses the server-based application.

Figure 6:
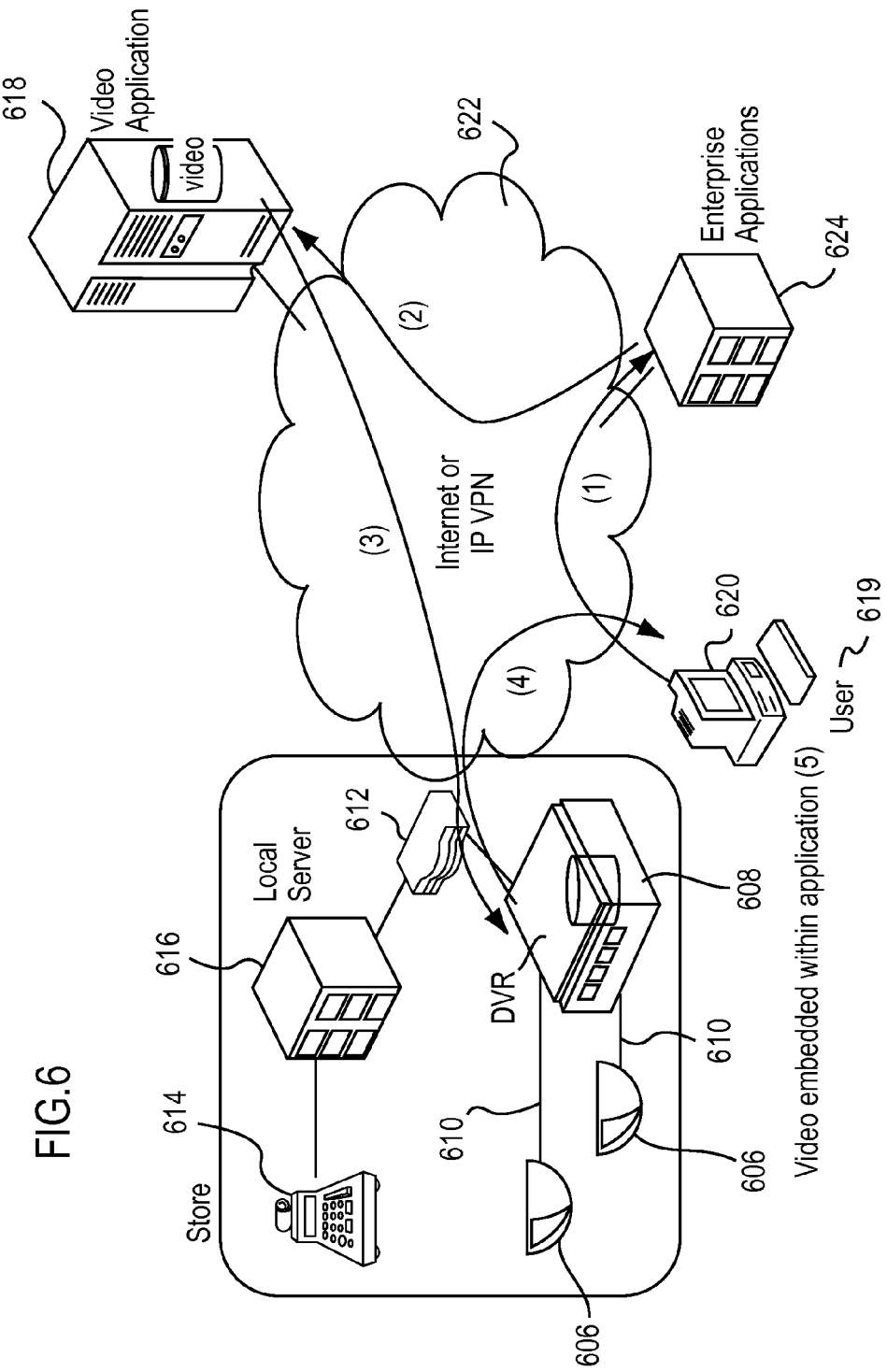
FIG. 6 is a block diagram depicting a method for incorporating video (and other data) collected by a data recording, monitoring and access system into other applications constructed in accordance with an aspect of the present invention.

Referring now to FIG. 6, the following sections describe the end-user experience of the System.

Installation. A typical installation comprises between 4 and 16 cameras 606, although the system can be adapted to support any number of cameras. These cameras 606 are installed with a system-compatible DVR or Appliance 608. The biggest difference in the customer premise installation is the DVR 608 itself. The Appliance 608 replaces a traditional DVR. The Appliance is a self-contained, "black box" device. The DVR 608 comprises a network interface to attach to the customer network. The DVR 608 includes a serial interface for connection to a data source, such as a point of sale system 614, either directly or, by way of a local server 616 (as illustrated in FIG. 6). The DVR 608 comprises a VGA monitor port that may optionally be used to connect to an external monitor.

The network interface on the DVR serves multiple purposes. It is used for communication with the Data Center which is required to utilize all the DVR's capabilities. The network interface on the DVR may also be used to communicate with data sources such as a point of sale system. In addition, the network interface may be used to communicate with cameras. The DVR may also include BNC (bayonet Neill-Concelman) connectors on the rear panel that connect to cameras using coaxial cables 610. The DVR network connection is usually an RJ45 connector and uses Ethernet to attach to a broadband router 612 at the customer premise.

Finally, the DVR 608 includes a power cable (not shown). In one embodiment, the DVR 608 does not have a keyboard or mouse.

In one embodiment, the DVR appliance 608 is physically installed and connected to the local broadband router 612. When powered on, the DVR 608 will dynamically request and receive an IP address from the local area network (LAN) and then automatically connect back to the system server-based application 618. Advantageously, no configuration of the local broadband router 612 is needed or necessary. In other embodiments, the DVR appliance 608 may be configured with a static IP address by a user. After configuration of the IP address, the DVR appliance 608 will automatically connect back to the system server-based appliance 618.

Once connected to the system server-based application 618, the appliance 608 will automatically register with the server-based application 618 and download any necessary configuration information.

Configuration. The DVR 608 is preferably pre-loaded with a default configuration. However, it is normally expected that a minimal amount of site-specific configuration will also be necessary. Typical configuration changes would be to provide names, adjust the frame rate, recording parameters for quality and motion for each camera view. In addition, the DVR may be configured to retrieve and process data from one more or data sources. These configuration changes are made via the system server-based application 618 which are then communicated with the Appliance DVR 608 on demand.

Connecting to the system server-based application 618. To access the server-based application 618, the user 619 gains access to a personal computer 620 or other device (such as a smart phone, or PDA) adapted to access server-based applications, such as server-based application 618, via the Internet or other communications network 622. Typically a broadband Internet connection may be used. Any computer 620 or other such device can be used (e.g., the local server computer in the store 616, a lap-top, a computer at home). The user can connect to the system server-based application 618 by directing a browser (for example, Internet Explorer, Mozilla or mobile web browser interfaces) to the Internet portal address of the server-based application 618. The user may also access an enterprise server 625, such as a business system solution, that houses other business-related applications and data.

As illustrated in FIG. 6, a remote user 619 may access the server-based application 618 directly (directional vector 5) or via an enterprise network hosted on an enterprise server 624, corresponding to directional vectors 1 and 2. Once the user 619 has accessed the server-based application 618, the user may access the Appliance DVR 608 and receive data from the other CPE that the Appliance DVR 608 communicates with, for example, cameras 606 and one or more data sources 614, as illustrated by vector 3. One skilled in the art will appreciate that the specific CPE configuration may vary, depending on the specific location to be monitored and the specific business and surveillance requirements demanded by the business. Additionally, one skilled in the art will appreciate that any number of separate CPE locations may be accessed by a single user in the same manner as depicted in FIG. 6.

In addition to the traditional approach to integration, where the video application extracts data from other applications, an advantage of the present invention is that its server-based approach allows other applications to incorporate video into their existing interfaces. In one embodiment, an Enterprise Application 624 may incorporate video by accessing the Video Application 618 on behalf of the user 619. An exemplary workflow, illustrated by vectors 1 through 4 in FIG. 6, includes the following: invoking an Enterprise Application 624 from the user's personal computer 620; the user requesting data analysis from the Enterprise Application 624 which initiates video lookups from the Enterprise Application 624 to the server-based application 618; identifying video segments in response to the specific request, the video segments being stored on DVRs located at one or more CPE locations; directly transmitting video from the DVR to the user's remote computer 620; and displaying the video embedded within the GUI display of the Enterprise Application 624 on the user's personal computer 620.

Figure 7:
FIG. 7 is an illustration of a graphical user interface in an exemplary embodiment of a data recording, monitoring and access system constructed in accordance with an aspect of the present invention.

Typical use of the system involves first connecting to the server-based application 618 and then accessing the functions of the system. FIG. 7 illustrates one embodiment of the home page of the server-based application. Through this interface, a user can view live video, search and play recorded video, as well as make configuration changes. The home page is the initial page that a user is taken to when the user logs in. Along with the standard menu bar at the top of the page, the home page comprises user-defined entries.

If the user has multiple sites, each with an installed DVR appliance 608, the cameras and resources associated with each will be visible through the server-based application.

Figure 8:
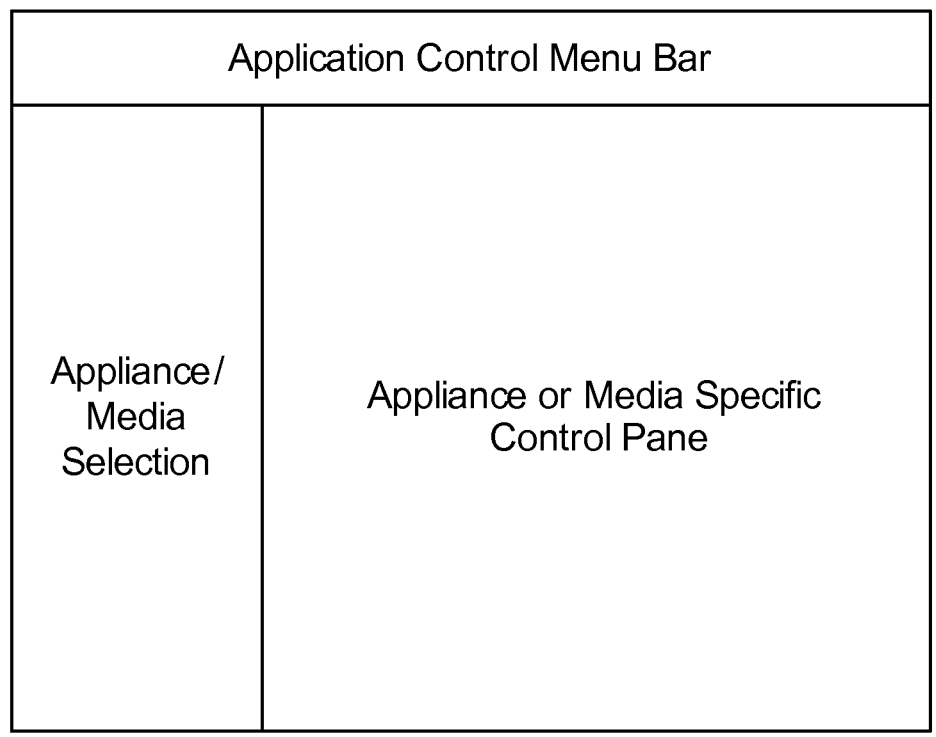
FIG. 8 is a block diagram depicting both physical and functional lay out of a graphical user interface of an exemplary embodiment of a video and data recording, monitoring and access system constructed in accordance with an aspect of the present invention.

The overall layout of the user interface for one embodiment is illustrated in FIG. 8. In general, every page is comprised of a set of application control buttons across the top. Below and to the left, is a navigation section. Below and to the right is a main function section. In this example, the navigation section contains the list of sites, DVR and Cameras.

FIG. 9 illustrates a site map 900 for one implementation of the present invention. The site map 900 depicts the primary functions, each mapping to an application control button, described as follows:

Login/Logoff 902—logs the user into and off of the server-based application site.

Home 904—initial home page for the application.

Sites 910—controls configuration and naming of the appliances that the user can control. From the sites page 910, the user may access pages to control appliances 930, administer appliances 932, and control media 934.

Live View 914—allows viewing of live media from connected sites. From the live view page 914, the user may access functions to obtain a view of a single media source 940, multiple media sources 944, and pan, tilt and zoom control 946. From the single media view 940, the user may access an event data function 942.

Search 916—allows searching through media. From the search page, the user may access a search results function 950, and from the search results function 950, to a media player function 952.

Export 918—allows export of media via copying of the media to the user's PC or to the data center.

Settings 920—allows change of various configuration settings in the server based application. From the settings function, the user may navigate to a change password function 960, a manage users function 970, and a manage profiles function 980. From the manage users function 970, the user may navigate to an add user function 972 and an edit user function 974. From the manage profiles function 980, the user may navigate to an add profile function 982 and an edit profile function 984.

In one exemplary embodiment of the present invention, all attempts to access the server-based application must be directed to the initial authentication or login page 902. On this page, the user is prompted to enter a name and password. The authentication page offers to save these credentials so that the user does not need to access this page in subsequent visits. Username and password information are preferably stored in an encrypted fashion.

Once authenticated, the user is granted access to the server-based application according to the user's profile and privilege level. As part of this authorization exchange, the user's domain is established. The domain is the administrative domain of the user. For example, the user's domain includes the set of appliances and services to which the user has visibility and access. Typically a domain encompasses one business organization. The server-based application supports many domains simultaneously in order to cost effectively scale to support many customers.

Each domain has a default username called "admin." This username has administrative access to all aspects of the Appliances and settings within that domain.

There is also a reset-password page. If a username is flagged in the system as having to be reset, then the user is forced to pass through the reset-password page, after completing authentication, but before proceeding to any other page. The reset-password page requires the user to enter a new password twice.

Passwords. Passwords are always stored encrypted. A user can't enter a password for anyone but him or her self (including the admin user). To change a password for someone else, the admin user can request that a specific user's password is reset. In this case, a random password is automatically generated and emailed to the address associated with the user. At next login, the user is prompted to reset his or her password.

In another embodiment, the overall layout of the sites page 910 comprises the following:

Application/Media selection. The navigation section lists the media input sources that are available to configure. The structure of this section is a hierarchical list (similar to the folders explorer bar in familiar PC-based applications). It represents the set of Appliances that this user is authenticated to control. On each Appliance, it lists the media sources that the user can control. This construct is hereafter referred to as the appliance/media selection control.

The format of the main function section changes based upon clicks within the navigation section. If the user clicks on a site name, then the main function section is set to appliance control. If the user clicks on a media source name, then the main function section is set to the media control.

The appliance-control page 930 allows the user to set an alias for the appliance.

The appliance administration page 932 allows the user to control and monitor the appliance. This page is accessed by selecting an appliance and then using the menu bar Site->Administration entry. This is an important function which allows users to know their Appliances are operating correctly and to manage Appliances distributed across a large number of sites.

The media control page 934 allows the user to control the media sources associated with the appliance. The first section of this page allows the user to set an alias for the media source and manipulate saved configurations. The second section of this page allows the user to view and manipulate frame rate, resolution, and recording mode. If the recording mode is motion, then the next two lines control post motion record buffer and motion sensitivity. Radio buttons indicate and allow a user to start and stop recording for that media source. The third section allows the user to view and control quality, brightness, sharpness, contrast, and hue.

The live view page 914 allows the user to view individual or combinations of media streams. The navigation section is used to select the appliance and media sources to view. The main function section is used for media control and to display media images. An additional section can be added to the page that displays live transaction data captured by the appliance selected.

Media stream display. The main function section is used to display one or more media streams, single view 940 and multi view 944, respectively. In one embodiment, it is structured as a set of control buttons across the top of the page, one or more media display sections, and a set of control buttons across the bottom of the page. The top control buttons reconfigure the layout of the display sub-sections. The bottom control buttons provide general control functions.

Media source controller view 946. If a media source (i.e., camera) has control capability (i.e., pan-tilt-zoom), the controller interface can be activated by opening the specific source in single view. The controller is displayed as an additional section to the right of the single camera view. The main function section is resized to accommodate the controller section.

The search function 916 is used to search through previously recorded media. The use of the search function requires navigation through two pages. The first page is used to specify the search criteria 916 and the second page is used to display the search results 950. The format of the search criteria page 916 follows the general format of the other pages. The navigation section is used to select the appliance and (optionally) media source for the search. If an appliance is selected, then the search applies to all media sources on that appliance. If specific media sources are selected, then the search applies to only those media sources. Multi-selection is possible which allows the selection of multiple appliances and/or multiple cameras.

The search results page 950 displays the results of the previous search. The format of this page is very similar to the search page, with a table at the bottom (below the search criteria) that displays the appliance name, camera name, start time/date and end time/date of each media clip that has been found. The camera names are displayed as a hyperlink. If clicked, then the user is directed to the media player page, with the selected media clip ready to stream.

In the media player page 952, the main function section is used to display one or more media streams. It is structured as a display/player, with a set of player controls below. The navigation section carries a set of auxiliary controls.

The settings page 970 allows the user to change attributes that are not specifically related to appliances or media sources.

The change profile page 980 allows users to edit their own information. They can change information associated with their username. They can also change their own password from the change password page 960.

The user management page 970 is used to add/delete/modify specific users within the domain.

Events are generated by the Appliance and sent to the server-based application. These events are processed by the server-based application in a user-defined fashion. New event information is relayed to users via multiple paths, including email as well as an event-console page.

A report is a collection of media footage and possibly data that is displayed together. The report is represented by a single link that can be clicked to begin streaming of the media and display of the data. That single link might represent multiple, different media clips that are seamlessly linked together.

In conclusion, the present invention provides, among other things, a system and method for recording, managing and accessing video, audio and data. Those skilled in the art can readily recognize that numerous variations and substitutions may be made in the invention, its use and its implementation to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A video and data recording, management and access system comprising:
 a customer network, including a VPN client, operable to video-graphically record video and Point of Sale (POS) events and to generate data from the POS events, wherein the customer network comprises a video camera to generate video images of the video and POS events and a POS device adapted to collect POS data, and wherein the customer network is operable to transmit the video images and the POS data using a communications network;
 a user network operable to access the video images and POS data on the customer network;
 one or more network address translating modules (NATs) and/or firewalls protecting the customer network and the user network from public access;
 a data center coupled to the customer network;
 a virtual private network (VPN) server of the data center coupled to the customer network via a VPN established by the VPN client, and coupled to the user network via a public Internet and an exception in a NAT and/or firewall of the VPN server; and
 a VPN established by the VPN client to the VPN server, wherein the VPN server associates a public IP address with the VPN client and makes the public IP address available to the user network via the exception in the NAT and/or firewall of the VPN server as well as a public Internet connection, and
 wherein the user network accesses the video images and POS data on the customer network by directing communications to the public IP address, which the VPN server routes to the customer network via the VPN.

2. The video and data recording, management and access system of claim 1 further comprising:
a plurality of customer networks; and
a plurality of user networks.

3. The video and data recording, management and access system of claim 2 wherein the communications network comprises the Public Internet.

4. The video and data recording, management and access system of claim 1 wherein:
the customer network comprises
a media server;
an event publisher;
a presence management client;
a media search facility; and
a communication management facility;
the data center comprises
an applications server;
a presence server;
an event server; and
a secure network server; and
the user network comprises
a browser that further comprises
a server-based application interface; and
a media player.

5. The video and data recording, management and access system of claim 1, wherein the VPN server assigns a private IP address to the customer network, associates the public IP address with the private IP address, and upon receiving communications from the user network directed to the public IP address, routes the communications to the customer network via the private IP address.

6. The video and data recording, management and access system of claim 1, wherein a data processing application running on the data center is operable on any of the user network, the data center or the customer network.

7. The video and data recording, management and access system of claim 6 further comprising an enterprise system coupled to the data center using the communications network wherein the video images and POS data are integrated into an enterprise data processing application, which enterprise data processing application is accessible on the user network.

8. The video and data recording, management and access system of claim 1, wherein the video images and POS data are stored on a server in the data center and on a DVR appliance in the customer network.

9. The video and data recording, management and access system of claim 4 further comprising:
a presence database, residing on the presence server, and configured to store an IP address of at least one digital video recorder (DVR) such that the user network can access the DVR using the public IP address;
a server-based application running on the applications server and configured to expose the presence database, by creating the exception in the NAT and/or firewall of the VPN server, to the user network so that the user network can access the DVR.

10. A system for two-way communication between a first and a second computer, the system comprising:
a first computer of a user network;
a second computer of a customer network, and wherein the second computer is a VPN client; and
a VPN server, wherein the first computer has access to one of a plurality of public IP addresses of the VPN server that the VPN server associates with the second computer;
a VPN established from the second computer to the VPN server,
wherein the first computer can communicate with the second computer by directing transmissions to the one of a plurality of public IP addresses, wherein the transmissions from the first computer to the second computer pass through a public Internet to the VPN server where the VPN server routes the transmissions to the second computer via the VPN.

11. The system of claim 10, wherein a server-based application operating on the VPN server provides a plurality of controls over the video camera.

12. The system of claim 10, wherein the VPN server assigns a private IP address to the second computer, associates the one of a plurality of public IP addresses with the private IP address, and upon receiving communications from the first computer directed to the public IP address, routes the communications to the second computer via the private IP address.

13. A method for recording, monitoring and accessing video and data, the method comprising:
establishing a virtual private network (VPN) between a VPN client and a VPN server;
associating one of a plurality of public IP addresses, assigned to the VPN server, with the VPN client;
creating an exception in a network address translating module (NAT) and/or firewall of the VPN server that enables a user network to access the VPN server through the public Internet;
exposing the one of the plurality of public IP addresses to the user network via the exception and the public Internet; and
requesting access to video and point-of-sale data of the VPN client using the one of the plurality of public IP addresses, where the request is routed through the public Internet and the exception in the NAT and/or firewall of the VPN server and then routed to the VPN client via the VPN.

14. The method of claim 13 further comprising invoking, from the user network, a server-based application on a data center that also comprises the VPN server, and viewing a live video signal within the server-based application.

15. The method of claim 14 wherein viewing a live signal further comprises viewing multiple video signals within the server-bases application.

16. The method of claim 14 further comprising controlling a video camera within the server-based application.

17. The method of claim 16 wherein controlling a video camera within the server-based application includes panning, tilting and zooming the video camera; and adjusting quality, brightness, sharpness, contrast, and hue.

18. The method of claim 13 further comprising:
controlling a customer premises appliance; and
monitoring a customer premises appliance.

19. The method of claim 13 wherein the establishing, associating, creating, exposing, and requesting further comprise accessing a plurality of customer premises appliances.

20. The method of claim 13 further comprising accessing POS data stored on the customer premises appliance.

* * * * *